US009205799B2

(12) United States Patent
Shibata et al.

(10) Patent No.: US 9,205,799 B2
(45) Date of Patent: Dec. 8, 2015

(54) AIRBAG AND AIRBAG DEVICE

(71) Applicant: Takata Corporation, Minato-ku Tokyo (JP)

(72) Inventors: Daisuke Shibata, Tokyo (JP); Kazuhiro Harazuka, Tokyo (JP); Akiko Miida, Tokyo (JP); Shinichi Sugimoto, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/563,903

(22) Filed: Dec. 8, 2014

(65) Prior Publication Data
US 2015/0158454 A1 Jun. 11, 2015

(30) Foreign Application Priority Data
Dec. 11, 2013 (JP) .................................. 2013-255623

(51) Int. Cl.
B60R 21/239 (2006.01)
B60R 21/231 (2011.01)
(52) U.S. Cl.
CPC ......... *B60R 21/23138* (2013.01); *B60R 21/239* (2013.01); *B60R 2021/2395* (2013.01); *B60R 2021/23146* (2013.01)
(58) Field of Classification Search
CPC .............. B60R 21/231; B60R 21/2342; B60R 2021/23382; B60R 2021/0048
USPC ................................................ 280/731, 743.2
See application file for complete search history.

(56) References Cited

U.S. PATENT DOCUMENTS

| 4,097,065 | A | * | 6/1978 | Okada et al. ................... 280/739 |
| 5,405,166 | A | | 4/1995 | Rogerson |
| 5,492,363 | A | * | 2/1996 | Hartmeyer et al. ........... 280/739 |
| 5,931,497 | A | | 8/1999 | Fischer |
| 6,095,557 | A | * | 8/2000 | Takimoto et al. ............. 280/739 |
| 6,283,507 | B1 | * | 9/2001 | Kami et al. ................. 280/743.1 |
| 6,773,027 | B2 | * | 8/2004 | Bohn et al. .................... 280/729 |
| 7,543,849 | B2 | * | 6/2009 | Bradburn ....................... 280/739 |
| 7,770,921 | B2 | * | 8/2010 | Mueller et al. ................. 280/739 |
| 8,267,425 | B2 | * | 9/2012 | Chida et al. .................... 280/736 |
| 8,888,128 | B1 | * | 11/2014 | Seo ................................ 280/739 |
| 2010/0102542 | A1 | * | 4/2010 | Nakajima et al. .......... 280/743.2 |

FOREIGN PATENT DOCUMENTS

| JP | H07-329694 A | 12/1995 |
| JP | H08-507989 A | 8/1996 |
| JP | H10-53084 A | 2/1998 |
| JP | 2007-050848 A | 3/2007 |
| JP | 2010-155566 A | 7/2010 |
| JP | 2010-535121 A | 11/2010 |
| JP | 2012-046072 A | 3/2012 |
| JP | 2013-23076 A | 2/2013 |
| WO | 2008/122346 A1 | 10/2008 |

* cited by examiner

*Primary Examiner* — James English
(74) *Attorney, Agent, or Firm* — Fitch Even Tabin & Flannery LLP

(57) ABSTRACT

An airbag and an airbag device are provided that can effectively prevent a rise of the internal pressure of the airbag when the airbag is hindered from being normally inflated/deployed while gas is prevented from being wasted. An airbag includes a pair of side panels that form a bag by being sewn together, an insertion hole formed in the side panel, and a valve disposed on an inner side of the side panel so as to stop up the insertion hole and having two end portions connected to the side panel. While the airbag is housed in the structure, the valve is drawn to an outer side of the side panel through the insertion hole and disposed so as to stop up the insertion hole and, while the airbag is inflated/deployed, the valve is drawn to the inner side of the side panel.

5 Claims, 4 Drawing Sheets

AIRBAG AND AIRBAG DEVICE

CROSS-REFERENCE TO RELATED APPLICATION

This application claims priority under the Paris Convention to Japanese Application No. 2013-255623, filed Dec. 11, 2013, the contents of which are incorporated herein by reference in its entirety.

FIELD OF THE INVENTION

The present invention relates to airbags and airbag devices, and particularly, it relates to an airbag and an airbag device suitable as a side airbag that is inflated/deployed between an occupant and a door portion.

BACKGROUND OF THE INVENTION

Typical vehicles such as automobiles have increasingly been equipped with an airbag device to inflate/deploy an airbag inside the vehicle in an emergency such as at a collision of the vehicle so as to absorb an impact exerted on an occupant. Such an airbag device typically includes an airbag and an inflator that supplies gas to the airbag. The airbag is normally housed in a structure of the vehicle in a folded state whereas the airbag is inflated/deployed in an emergency.

For example, a side airbag that is inflated/deployed between an occupant and a door portion is embedded in a rear portion (seat back) of a seat on which the occupant is seated. At a collision of the vehicle, the side airbag breaks through the seat or pushes aside the seat to be released forward inside the vehicle. Methods have been developed for such a side airbag device to prevent a rise of the internal pressure of the airbag in the case where the airbag is hindered from being normally inflated/deployed (see, for example, Japanese Unexamined Patent Application Publication No. 2007-50848 and Japanese Unexamined Patent Application Publication (Translation of PCT Application) No. 2010-535121).

An airbag device described in Japanese Unexamined Patent Application Publication No. 2007-50848 includes a vent hole formed at a corner portion of a lower bag and a cloth member that has such a size and a shape as to be capable of closing the vent hole and that has a through hole. Before the lower bag is deployed into a predetermined shape, the position of the through hole coincides with the position of the vent hole to allow gas to be discharged from the lower bag. On the other hand, when the lower bag is deployed into a predetermined shape, the tension exceeding a predetermined value is exerted on the cloth member to break a tear seam portion, so that the through hole moves forward and the cloth member closes the vent hole.

An airbag device described in Japanese Unexamined Patent Application Publication (Translation of PCT Application) No. 2010-535121 includes a side panel and a closing panel. The side panel serves as an outer surface of the side airbag and defines a vent hole for releasing gas to the outer side of the side airbag. The closing panel is disposed around the vent hole and configured to keep the vent hole open to release the gas while the side airbag is inflated until the side airbag is substantially fully inflated.

SUMMARY OF THE INVENTION

In the airbag devices described in Japanese Unexamined Patent Application Publication No. 2007-50848 and Japanese Unexamined Patent Application Publication (Translation of PCT Application) No. 2010-535121, the vent hole is kept in the open state while the airbag is housed before being inflated/deployed. The vent hole is kept in the open state at the initial stage of the inflation/deployment. The vent hole is switched into the closed state when the internal pressure of the airbag arrives at a predetermined internal pressure.

Such a configuration is disadvantageous in that gas is wasted without being utilized for inflation/deployment of the airbag at the initial stage of the inflation/deployment of the airbag, whereby a large inflator is required.

The present invention was made in view of the above-described problem and aims to provide an airbag and an airbag device that can effectively prevent a rise of the internal pressure of the airbag when the airbag is hindered from being normally inflated/deployed while gas is prevented from being wasted.

The present invention provides an airbag that is normally folded so as to be housed in a structure of a vehicle whereas inflated/deployed with a supply of gas in an emergency. The airbag includes a side panel that forms a bag by being sewn, an insertion hole formed in the side panel, and a valve disposed on an inner side of the side panel so as to stop up the insertion hole and having two end portions connected to the side panel. While the airbag is housed in the structure, the valve is drawn to an outer side of the side panel through the insertion hole and disposed so as to stop up the insertion hole and, while the airbag is inflated/deployed, the valve is drawn to the inner side of the side panel.

The present invention also provides an airbag device that includes an airbag that is normally folded so as to be housed in a structure of a vehicle and that is inflated/deployed in an emergency and an inflator that supplies gas to the airbag. The airbag includes a side panel that forms a bag by being sewn, an insertion hole formed in the side panel, and a valve disposed on an inner side of the side panel so as to stop up the insertion hole and having two end portions connected to the side panel. While the airbag is housed in the structure, the valve is drawn to an outer side of the side panel through the insertion hole and disposed so as to stop up the insertion hole and, while the airbag is inflated/deployed, the valve is drawn to the inner side of the side panel.

In the airbag and the airbag device, the valve may remain situated on the outer side of the side panel when the airbag is hindered from being inflated/deployed and may allow gas to be released to an outside through the insertion hole. Two end portions of the valve may be arranged so as to extend in a direction in which the airbag is inflated/deployed. Further, while the airbag is housed in the structure, the valve may be connected to the side panel so as to keep stopping up the insertion hole and, when the valve receives a predetermined pressure, the valve may be disconnected from the side panel. The airbag is, for example, a side airbag that is inflated/deployed between an occupant and a door portion.

In the airbag and the airbag device according to the present invention, a valve can be kept closed at the initial stage of inflation/deployment of the airbag and thus stop up an insertion hole. This configuration can prevent gas from being wasted at the initial stage. When the airbag is normally inflated/deployed subsequent to the initial stage of the inflation/deployment of the airbag, the valve is immediately drawn into the airbag and stops up the insertion hole from the inside, whereby the internal pressure of the airbag can be appropriately maintained.

On the other hand, when the airbag is hindered from being normally inflated/deployed by, for example, being interfered with an obstruction after the initial stage of the inflation/deployment of the airbag, the valve is not drawn into the airbag. This configuration allows gas to be released to the outside through the insertion hole in accordance with a rise of the internal pressure of the airbag so that the internal pressure of the airbag can be reduced. The airbag can thus function in a similar manner as an existing airbag.

According to the above-described invention, the insertion hole can be kept closed throughout the normal inflation/deployment of the airbag, whereas the insertion hole can be switched into an open state when the airbag is hindered from being normally inflated/deployed by, for example, being interfered with an obstruction in order to release the gas to the outside. In this manner, the internal pressure of the airbag can be effectively prevented from rising.

BRIEF DESCRIPTION OF THE DRAWINGS

FIG. 2A illustrates the airbag at a preceding stage of the inflation/deployment, FIG. 2B illustrates the airbag at a completion stage of the inflation/deployment, and FIG. 2C illustrates the airbag at an intermediate stage of the inflation/deployment.

FIG. 3A illustrates the valve in a closed state at the initial stage of the inflation/deployment, FIG. 3B illustrates the valve in the closed state at the completion stage of the inflation/deployment, FIG. 3C illustrates the valve in the open state at the intermediate stage of the inflation/deployment, and FIG. 3D illustrates a valve according to a modified example in the closed state at the initial stage of the inflation/deployment.

FIG. 4A illustrates an airbag according to a second embodiment and FIG. 4B illustrates an airbag according to a third embodiment.

DETAILED DESCRIPTION OF THE PREFERRED EMBODIMENTS

Figure 1:
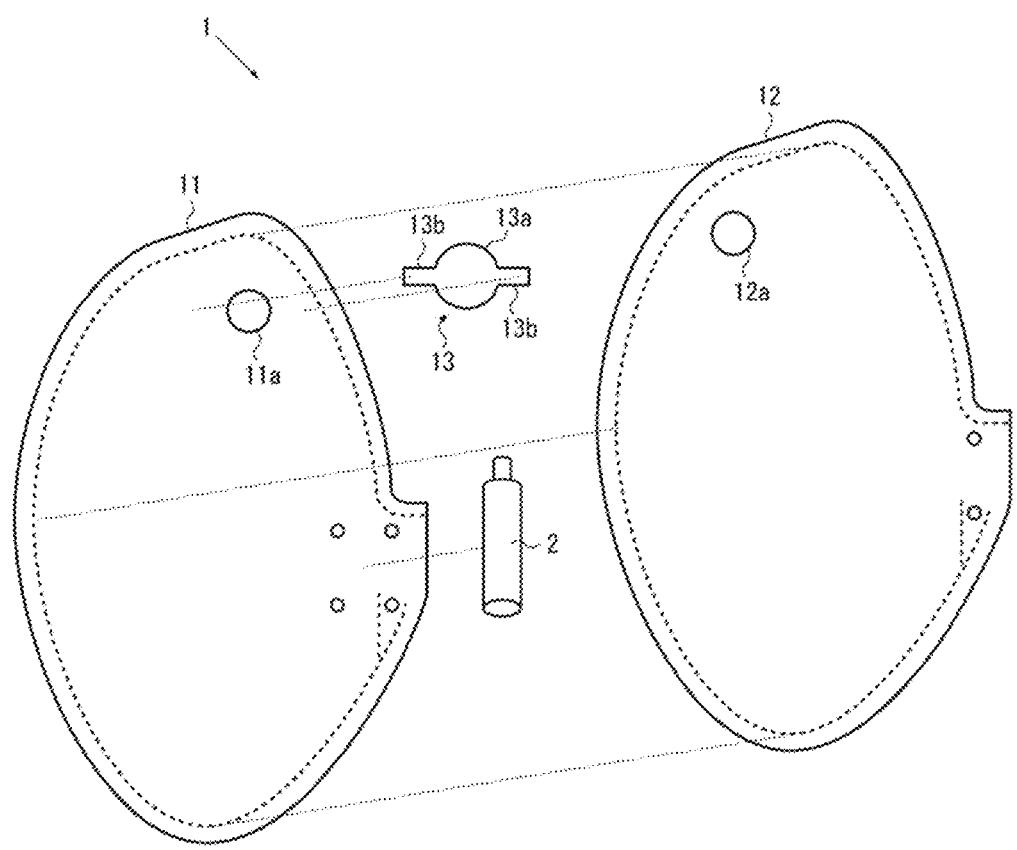
FIG. 1 is an exploded view of components of an airbag device according to a first embodiment of the present invention.

Referring now to FIGS. 1 to 4B, embodiments of the present invention are described below. FIG. 1 is an exploded view of components of an airbag device according to a first embodiment of the present invention. FIGS. 2A to 2C illustrate stages of inflation/deployment of the airbag illustrated in FIG. 1 where FIG. 2A illustrates the airbag at a preceding stage of the inflation/deployment, FIG. 2B illustrates the airbag at a completion stage of the inflation/deployment, and FIG. 2C illustrates the airbag at an intermediate stage of the inflation/deployment. FIGS. 3A to 3D illustrate operations of a valve where FIG. 3A illustrates the valve in a closed state at the initial stage of the inflation/deployment, FIG. 3B illustrates the valve in the closed state at the completion stage of the inflation/deployment, FIG. 3C illustrates the valve in the open state at the intermediate stage of the inflation/deployment, and FIG. 3D illustrates a valve according to a modified example in the closed state at the initial stage of the inflation/deployment. In FIGS. 2A to 2C, for convenience of illustration, an airbag 1 is viewed from the side facing an occupant and a seat S is drawn by dot-and-dash lines.

As illustrated in FIGS. 1 to 3D, an airbag device according to a first embodiment of the present invention includes an airbag 1 and an inflator 2 that supplies gas to the airbag 1. The airbag 1 is normally housed in a structure of a vehicle in a folded state whereas the airbag 1 is inflated/deployed in an emergency. The airbag 1 includes a pair of side panels 11 and 12, which are sewn together to form a bag body, an insertion hole 11a, formed in the side panel 11, and a valve 13, which is disposed on the internal side of the side panel 11 so as to stop up the insertion hole 11a and which has both end portions connected to the side panel 11. When the airbag 1 is housed in the vehicle structure, the valve 13 is drawn to the outer side of the side panel 11 through the insertion hole 11a and is disposed so as to stop up the insertion hole 11a. When the airbag 1 is inflated/deployed, the valve 13 is drawn to the inner side of the side panel 11.

Figure 2A:
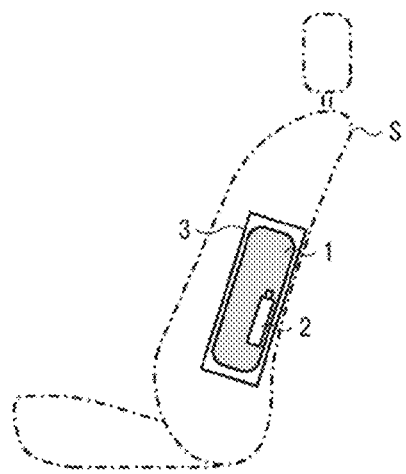
FIGS. 2A to 2C illustrate stages of inflation/deployment of the airbag illustrated in FIG. 1 where
Figure 2B:
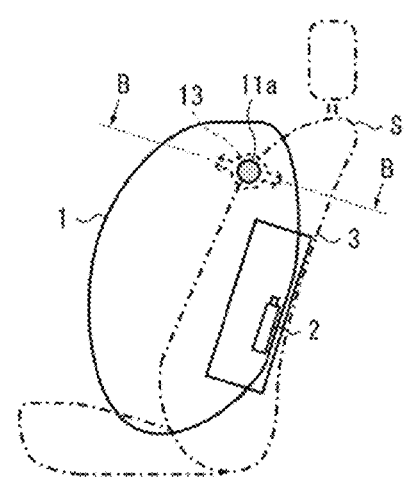

As illustrated in FIGS. 2A and 2B, for example, the airbag device described above is a side airbag device that is inflated/deployed between an occupant and a door portion and is installed in a seat S such as a front seat (a driver's seat or a passenger seat) or a rear seat. Specifically, the airbag 1 is encased in an airbag case 3 in a folded state and fixed in a side portion on a seat back of the seat S on the door-portion side.

The inflator 2 is a gas generator that generates gas to be supplied to the airbag 1. The inflator 2 has, for example, a substantially cylindrical outline. The inflator 2 is connected to an attachment portion of the airbag 1 using a fastener (not illustrated) such as a bolt and encased in the airbag case 3 together with the airbag 1. When the airbag 1 and the inflator 2 are encased in the airbag case 3, the airbag 1 is folded in a predetermined manner (for example, so as to be pleated, rolled, or pleated and rolled) and the inflator 2 is fixed to the airbag case 3.

The inflator 2 is connected to an electrical control unit (ECU), not illustrated, and is controlled on the basis of measurement values of an accelerometer or the like. When the ECU detects a collision of the vehicle, the inflator 2 is ignited by an igniting current from the ECU. Thus, the inflator 2 generates gas by burning a chemical stored inside the inflator 2 and supplies the gas to the airbag 1. The airbag 1 starts being inflated/deployed inside the airbag case 3 and breaks through a cleavable portion (not illustrated) of the seat S or pushes aside the seat S to be released to the inside of the vehicle.

As illustrated in FIG. 1, the airbag 1 is formed by sewing together the peripheries of a pair of overlapping side panels 11 and 12 having substantially the same shape. For example, the side panel 11 disposed on the side facing an occupant has an insertion hole 11a and the side panel 12 disposed on the side facing the door portion has a vent hole 12a. The airbag 1, which is a bag body, may be constituted by a single base cloth as the side panels 11 and 12, and formed by folding the cloth and sewing the overlapping portions of the cloth together.

The vent hole 12a is an opening that is kept open all the time and reduces an impact exerted on an occupant when the occupant comes into contact with the airbag 1. The vent hole 12a may be omitted depending on the type or shape of the airbag 1. The vent hole 12a may be formed in the side panel 11 disposed on the side facing an occupant. Alternatively, the vent hole 12a may be formed by utilizing the sewn portions between the side panels 11 and 12. The position or shape of the vent hole 12a is not limited to the one illustrated in the drawing.

The insertion hole 11a is an opening that allows the valve 13 to pass therethrough between the inner and outer sides of the side panel 11. The insertion hole 11a is usually kept closed while the airbag 1 is normally inflated/deployed. Depending on the type or shape of the airbag 1, the insertion hole 11a may be formed in the side panel 12 on the side facing the door portion or may be formed at another position.

As illustrated in FIG. 1, for example, the valve 13 includes a wide portion 13a, which is larger in shape than the insertion hole 11a, and tether portions 13b that tether the wide portion 13a to the side panel 11. The base cloth of the valve 13 is made of, for example, the same material as that of the side panels 11 and 12. The tether portions 13b are arranged at both ends of the wide portion 13a so as to extend in the direction in which the airbag 1 is inflated/deployed. End portions of the tether portions 13b are connected to the side panel 11 by being sewn on the inner side of the side panel 11. Specifically, both end portions of the valve 13 are arranged in the direction in which the airbag 1 is inflated/deployed.

Figure 3A:
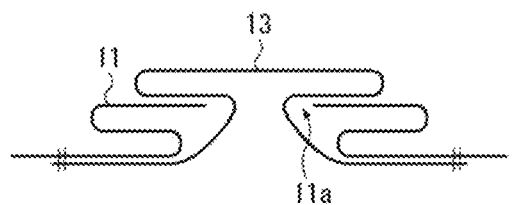
FIGS. 3A to 3D illustrate operations of a valve where
Figure 3B:
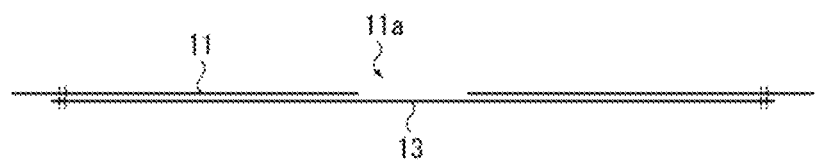

FIG. 3B is a cross-sectional view of the side panel 11 taken along the line B-B at the completion stage of the inflation/deployment of the airbag 1 illustrated in FIG. 2B. As illustrated in FIG. 1, disposing the valve 13 on the inner surface of the side panel 11 allows the valve 13 to expand so as to be substantially flat on the inner side of the side panel 11 at the completion stage of the inflation/deployment of the airbag 1. Thus, the valve 13 is brought into close contact with the inner surface of the side panel 11 by the internal pressure of the airbag 1 to stop up the insertion hole 11a.

At the preceding stage of the inflation/deployment of the airbag 1 illustrated in FIG. 2A, the valve 13 is encased in the airbag case 3 in a folded state, as illustrated in FIG. 3A. The valve 13 is drawn to the outer side of the side panel 11 through the insertion hole 11a and disposed so as to stop up the insertion hole 11a. Since the valve 13 includes the wide portion 13a having a larger shape than the insertion hole 11a, the valve 13 can easily stop up the insertion hole 11a by being drawn out through the insertion hole 11a and folded flat. When the airbag 1 is folded while the valve 13 is flattened, the insertion hole 11a can be kept closed.

While the airbag 1 is normally inflated/deployed, the airbag 1 is duly switched from the state illustrated in FIG. 2A to the state illustrated in FIG. 2B. At this time, in the process of deploying the airbag 1 from the closed state illustrated in FIG. 3A so as to be unfolded toward the vehicle front, the valve 13 is drawn to the inside of the airbag 1 through the insertion hole 11a to stop up the insertion hole 11a as a result of the tether portions 13b sewn on the side panel 11 being drawn by the deployment of the side panel 11 in the vehicle front-rear directions. Thus, the valve 13 is switched into the closed state illustrated in FIG. 3B. This configuration can minimize a leakage of gas throughout the inflation/deployment of the airbag 1 even in the case where the side panel 11 has the insertion hole 11a, whereby the inflator can be sized smaller.

Figure 2C:
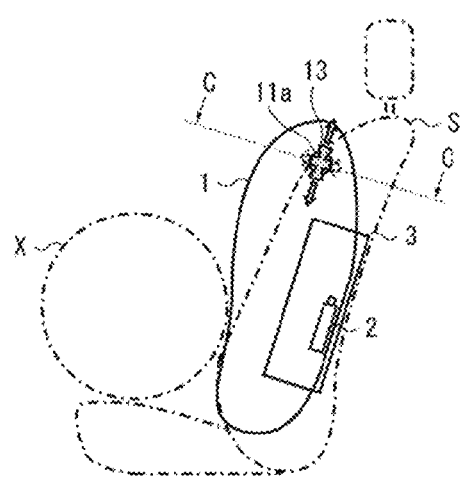

As illustrated in FIG. 2C, on the other hand, in the case where an obstruction X stays on the seat S at the inflation/deployment of the airbag 1 and prevents the airbag 1 from being inflated/deployed frontward, the airbag 1 fails to be normally inflated/deployed and the internal pressure of the airbag 1 rises. To prevent a rise of the internal pressure of the airbag 1, the airbag 1 according to this embodiment includes a gas releasing mechanism, constituted by the insertion hole 11a and the valve 13.

Figure 3C:
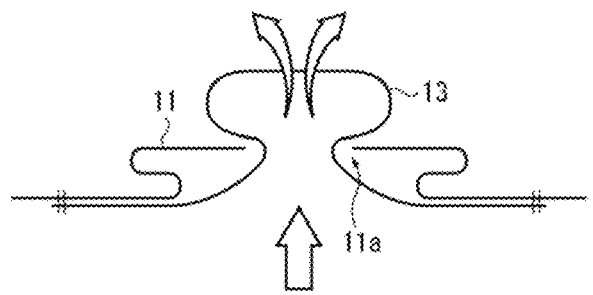

FIG. 3C is a cross-sectional view of the side panel 11 taken along the line C-C at the intermediate stage of the inflation/deployment of the airbag 1 illustrated in FIG. 2C. The valve 13 remains situated on the outer side of the side panel 11 in the case where the airbag 1 is hindered from being inflated/deployed so as to allow gas to be released outward through the insertion hole 11a.

As illustrated in FIG. 2C, when the airbag 1 is hindered from being normally inflated/deployed, the airbag 1 is prevented from being inflated/deployed forward. Thus, as illustrated in FIG. 3C, the valve 13 does not receive load large enough to draw itself inside the airbag 1, whereby the valve 13 remains situated on the outer side. At this time, the airbag 1 is in the middle of being inflated/deployed and the valve 13 is loose. Thus, the valve 13 allows gas to be released outward through the insertion hole 11a in accordance with a rise of the internal pressure of the airbag 1.

The airbag 1 and the airbag device according to this embodiment include the side panel 11 that has an insertion hole 11a and the valve 13 that has the above-described configuration. Thus, the insertion hole 11a can be kept closed throughout normal inflation/deployment of the airbag 1 and the insertion hole 11a can be switched into the open state at abnormal inflation/deployment of the airbag 1 to release gas. Thus, the airbag 1 and the airbag device according to this embodiment can effectively prevent a rise of the internal pressure of the airbag 1 when the airbag 1 is hindered from being normally inflated/deployed while retaining the similar functions as an existing airbag.

Figure 3D:
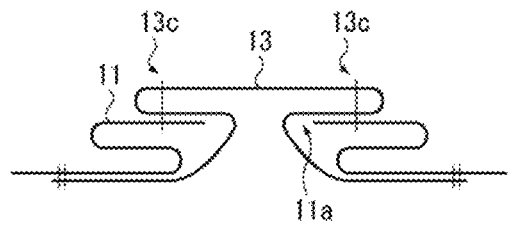

As illustrated in FIG. 3D, the valve 13 may include a tear seam portion 13c sewn on the side panel 11 while being encased. The tear seam portion 13c may be formed so as to surround the entire circumference of the insertion hole 11a or part of the circumference of the insertion hole 11a. The tear seam portion 13c is so formed that the thread with which the tear seam portion 13c is sewn is broken when receiving a predetermined pressure.

In other words, the valve 13 is connected to the side panel 11 so as to keep stopping up the insertion hole 11a while the airbag 1 is housed, whereas the valve 13 is disconnected upon receipt of a predetermined pressure. Here, the valve 13 is connected to the side panel 11 by being sewn on the side panel 1, but may be connected using other means such as an adhesive or a transparent adhesive tape.

Figure 4A:
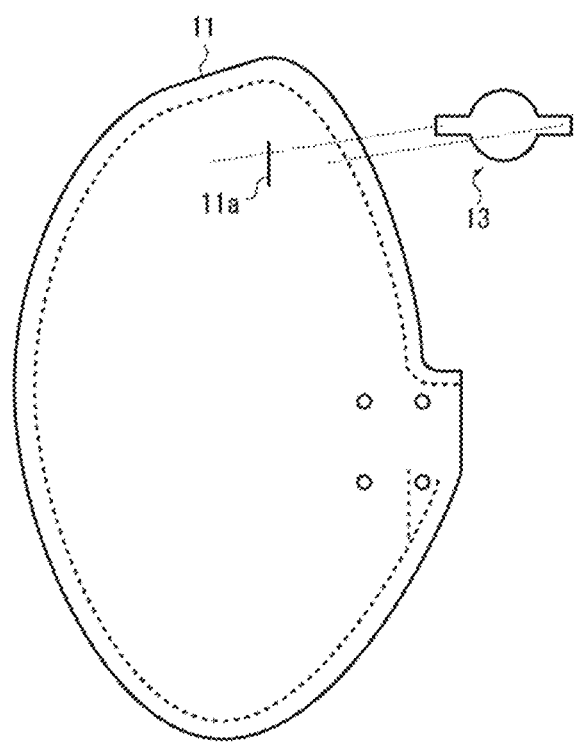
FIGS. 4A and 4B illustrate airbags according to other embodiments of the present invention where
Figure 4B:
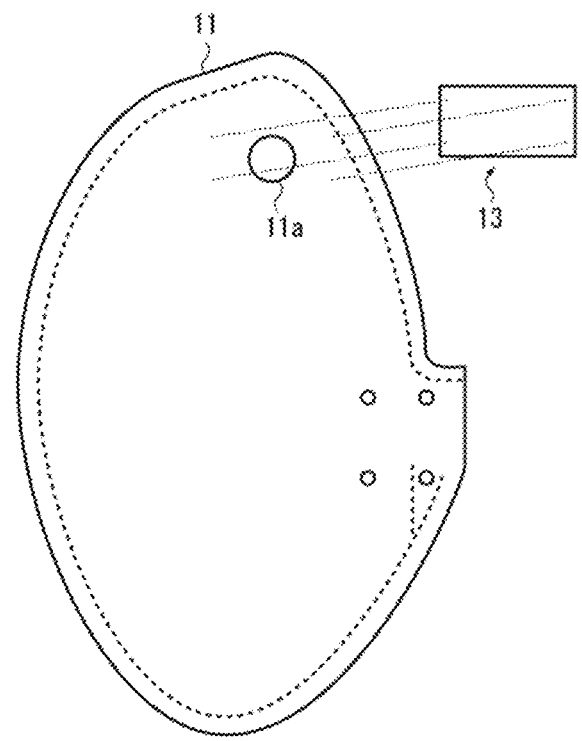

Referring now to FIGS. 4A and 4B, airbags 1 according to other embodiments of the present invention will be described. Here, FIGS. 4A and 4B illustrate airbags according to other embodiments of the present invention where FIG. 4A illustrates an airbag according to a second embodiment and FIG. 4B illustrates an airbag according to a third embodiment. Components that are the same as those of the first embodiment are denoted by the same reference symbols and not redundantly described.

The airbag 1 according to the second embodiment illustrated in FIG. 4A has a slit (a cut) serving as the insertion hole 11a. This configuration can minimize a gap between the valve 13 and the insertion hole 11a, and thus can further reduce the leakage of gas.

The airbag 1 according to the third embodiment illustrated in FIG. 4B has a rectangular member serving as the valve 13. The rectangular member has a width larger than the diameter of the insertion hole 11a. This configuration can also function substantially similarly to the valve 13 having a wide portion 13a.

As illustrated in the second embodiment and the third embodiment, the shape of the insertion hole 11a or the valve 13 is appropriately changed depending on the conditions such as the type or the capacity of the airbag 1 or the location of the insertion hole 11a and is not limited to the one illustrated in the drawings.

The present invention is not limited to the embodiments described above and can naturally be modified in various manners within the scope not departing from the gist of the invention. For example, the present invention is applicable to airbags other than side airbags.

What is claimed is:
1. An airbag that is normally folded so as to be housed in a structure of a vehicle until inflated/deployed with a supply of gas in an emergency, the airbag comprising:
 a side panel that forms a bag by being sewn;
 an insertion hole formed in the side panel; and a valve disposed on an inner side of the side panel so as to stop up the insertion hole and having two end portions connected to the side panel, wherein, while the airbag is housed in the structure, the valve is drawn to an outer side of the side panel through the insertion hole and disposed so as to stop up the insertion hole and, while the airbag is inflated/deployed, the valve is drawn to the inner side of the side panel, wherein, while the airbag is housed in the structure, the valve is connected to the side panel so as to keep stopping up the insertion hole and, when a predetermined load is applied, the valve is disconnected from the side panel.

2. The airbag according to claim 1, wherein the valve remains situated on the outer side of the side panel when the airbag is hindered from being inflated/deployed and allows gas to be released to an outside through the insertion hole.

3. The airbag according to claim 1, wherein two end portions of the valve are arranged so as to extend in a direction in which the airbag is inflated/deployed.

4. The airbag according to claim 1, wherein, the airbag is a side airbag that is inflated/deployed between an occupant and a door portion.

5. An airbag device, comprising:

an airbag that is normally folded so as to be housed in a structure of a vehicle and that is inflated/deployed in an emergency; and an inflator that supplies gas to the airbag, wherein the airbag is the airbag according to claim 1.

\* \* \* \* \*